(12) United States Patent
Mathews

(10) Patent No.: US 11,748,061 B2
(45) Date of Patent: Sep. 5, 2023

(54) CUSTOM MASS MULTIPLICATION CIRCUITS

(71) Applicant: Mark Ashley Mathews, Fairfield, CA (US)

(72) Inventor: Mark Ashley Mathews, Fairfield, CA (US)

(73) Assignee: GIGANTOR TECHNOLOGIES INC., Melbourne Beach, FL (US)

( * ) Notice: Subject to any disclaimer, the term of this patent is extended or adjusted under 35 U.S.C. 154(b) by 407 days.

(21) Appl. No.: 17/071,875

(22) Filed: Oct. 15, 2020

(65) Prior Publication Data

US 2022/0121419 A1   Apr. 21, 2022

(51) Int. Cl.
*G06F 7/523*     (2006.01)
*G06F 17/16*     (2006.01)
*G06N 3/063*     (2023.01)
*G06F 7/50*      (2006.01)

(52) U.S. Cl.
CPC ............. *G06F 7/523* (2013.01); *G06F 7/50* (2013.01); *G06F 17/16* (2013.01); *G06N 3/063* (2013.01)

(58) Field of Classification Search
CPC ........... G06F 7/523; G06F 7/50; G06N 3/023
See application file for complete search history.

(56) References Cited

U.S. PATENT DOCUMENTS

| | | | |
|---|---|---|---|
| 11,099,854 | B1 | 8/2021 | Mathews |
| 2001/0023425 | A1 | 9/2001 | Oberman et al. |
| 2004/0168044 | A1 | 8/2004 | Ramchandran |
| 2019/0146788 | A1 | 5/2019 | Kim |
| 2019/0303103 | A1 | 10/2019 | Hah et al. |
| 2019/0303748 | A1* | 10/2019 | Hah ...................... G06N 3/063 |

* cited by examiner

*Primary Examiner* — Michael D. Yaary
(74) *Attorney, Agent, or Firm* — Donald R. Boys; Central Coast Patent Agency LLC

(57) ABSTRACT

A mass multiplier implemented as an integrated circuit has a port receiving a stream of discrete values and circuitry multiplying each value as received by a plurality of weight values simultaneously. An output channel provides products of the mass multiplier as produced. The mass multiplier is applied to neural network nodes.

9 Claims, 7 Drawing Sheets

CUSTOM MASS MULTIPLICATION CIRCUITS

BACKGROUND OF THE INVENTION

1. Field of the Invention

The present invention is in the technical area of computer operations involving matrix inputs and outputs and pertains more specifically to circuits designed for mass multiplication in matrix operations.

2. Description of Related Art

Use of computers in matrix operations is well-known in the art, specific examples being image processing and development and use of neural networks. Neural networks are part and parcel of artificial intelligence, and as such are, at the time of filing the instant patent application, a very popular subject in development of intellectual property. Generally speaking, in computer operations of this sort, substantial numbers of input values are processed in a regular pattern, the pattern being in most instances a matrix. Processing of input values may involve biasing and applying weights by which individual input values may be multiplied.

The present inventor believes that the sophisticated and computationally intense operations in the technology of neural networks wherein incoming values are multiplied by each of a plurality of weight values, is a step open to innovation to provide distinct advantages in the technology. The inventor also believes that there are advantages to be gained in revising the order of mathematical processes to be applied The present inventor believes that he has determined a general change in the order and manner of mathematical processes to be implemented in such applications that may well produce a very significant reduction time and cost in such operations.

BRIEF SUMMARY OF THE INVENTION

In an embodiment of the invention a mass multiplier implemented as an integrated circuit is provided, comprising a port receiving a stream of discrete values and circuitry multiplying each value as received by a plurality of weight values simultaneously. An output channel providing products of the mass multiplier as produced. In one embodiment the discrete values received are unsigned binary of fixed width, the weight values are unsigned binary of fixed width of two or more bits, and each multiple is composed as a summation of bit-shifted duplicates of the input. Also, in one embodiment the set of shifted duplicates is increased to allow the use of subtraction operations to reduce or otherwise optimize the circuit.

In one embodiment of the mass multiplier unused outputs of the set may be omitted either explicitly or implicitly. Also, in one embodiment the set of output products is produced by combinatorial logic. Also, in one embodiment the set of output products is produced by a single stage pipeline, using single or multiple clock cycles. In one embodiment the set of output multiples is produced by a multi-stage pipeline by combining no more than two addends per stage. In one embodiment unused elements of the intermediate sub-compositions are eliminated from the circuit either explicitly or implicitly.

In one embodiment of the invention the set of output products is produced by a multi-stage pipeline by combining three or more addends per stage and the sub-compositions are adjusted accordingly. And in one embodiment unused elements of the intermediate sub-compositions are eliminated from the circuit either explicitly or implicitly.

In another aspect of the invention a first convolutional neural network (CNN) node, implemented as an integrated circuit is provided, comprising a first input channel defined as a stream of discrete values of a first component of an element of an array, a first mass multiplier circuit multiplying the discrete values of the first component, as received, by a plurality of weight values simultaneously, and an output channel providing an output stream of discrete values.

In one embodiment of the CNN node the first output stream is derived from products of the first mass multiplier circuit in some circumstances by combining products with constants and in some circumstances by applying an activation function. Also in one embodiment the CNN node further comprises a second input channel defined as a stream of discrete values of a second component of the element of the array and a second mass multiplier circuit multiplying the discrete values of the second component, as received, by a plurality of weight values simultaneously. In one embodiment the CNN node further comprises a third input channel defined as a stream of discrete values of a third component of the element of the array and a third mass multiplier circuit multiplying the discrete values of the third component, as received, by a plurality of weight values simultaneously.

In another aspect of the invention a convolutional neural network (CNN) is provided, comprising a first convolutional neural network (CNN) node, implemented as an integrated circuit, comprising input channels defined as streams of discrete values of components of elements of an array, mass multiplier circuits dedicated to individual input channels, multiplying the discrete values of components, as received, by a plurality of weight values simultaneously, and an output channel providing an output stream of discrete values, and a second CNN node having input at least partially dependent on output of the first node. In one embodiment the neural network further comprises successive nodes and operating as a deep neural network (DNN).

In yet another aspect a computation method is provided, comprising implementing a mass multiplier circuit in an integrated circuit, receiving a stream of discrete values at a port of the integrated circuit, multiplying each value as received by a plurality of weight values simultaneously by the mass multiplier circuit, and providing products of the mass multiplier as produced by an output channel.

DETAILED DESCRIPTION OF THE INVENTION

Figure 1:
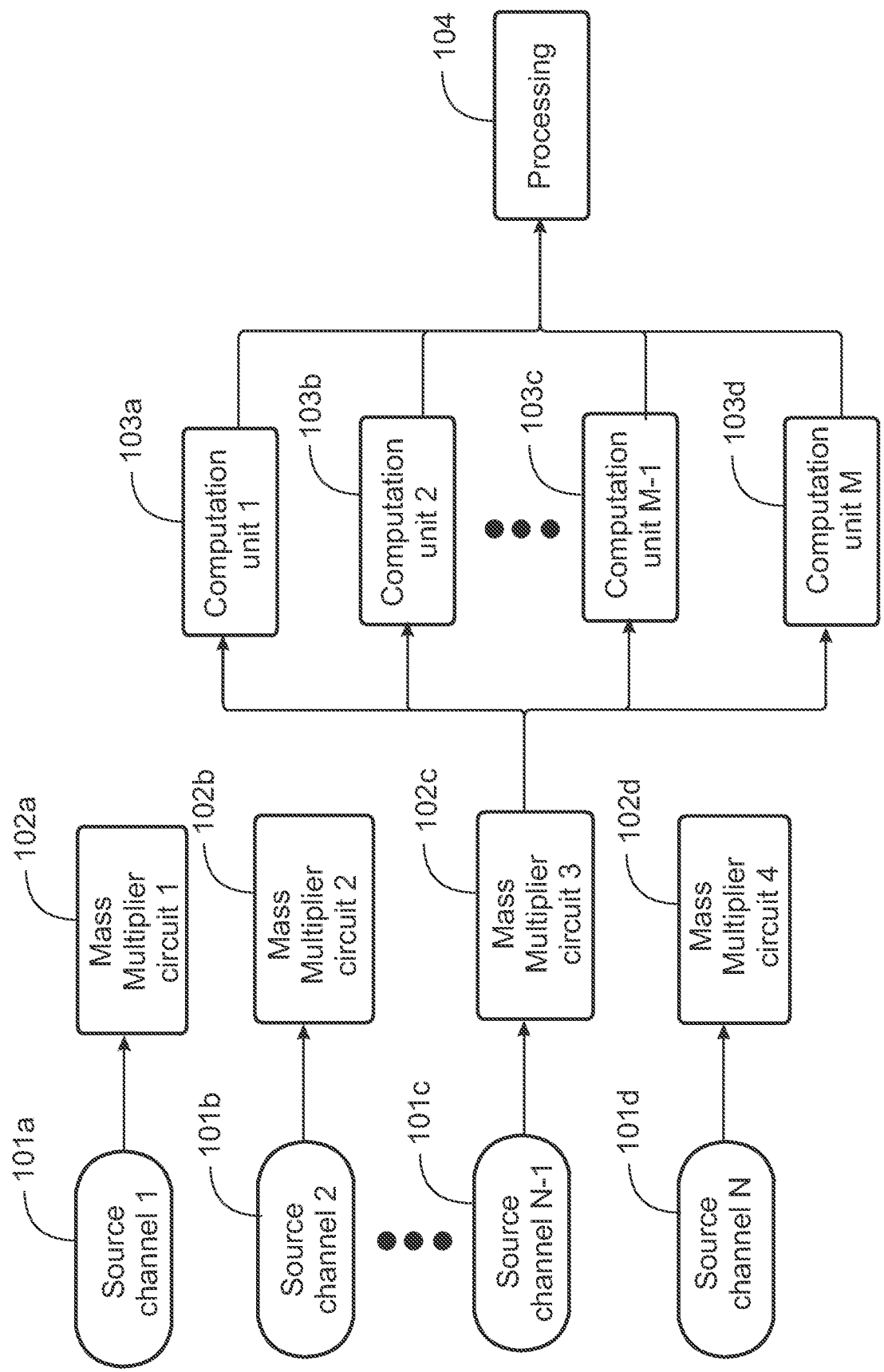
FIG. 1 illustrates an embodiment where mass multipliers applied to each common source are fixed and wired directly into a processing circuit.

A wide variety of image and data algorithms make extensive use of matrix forms of linear algebra both to prove propositions and to calculate results. In the instant application by "an algorithm" is meant a process or set of rules to be followed in calculations or other problem-solving operations, especially by a computer. Algorithms are not to be universally construed as software in this application. Algorithms as described in the instant application may, and typically are preferably, implemented in hardware.

Matrix operations are defined as orthogonal collections of one or more dimensions and are generally conceived as having the same number of elements in every iteration of each given dimension. By way of example, an M by N matrix is frequently depicted by an array of values such as:

$$A = \begin{bmatrix} a_{1,1} & a_{1,2} & \cdots & a_{1,N-1} & a_{1,N} \\ a_{1,1} & a_{1,2} & \cdots & a_{1,N-1} & a_{1,N} \\ \vdots & \vdots & & \vdots & \vdots \\ a_{M-1,1} & a_{M-1,2} & \cdots & a_{M-1,N-1} & a_{M-1,N} \\ a_{M,1} & a_{M,2} & \cdots & a_{M,N-1} & a_{M,N} \end{bmatrix}$$

Conceptually, a matrix may have any number of dimensions and the matrices may be depicted as sets of tables showing the values for each dimension.

The subset of matrices of the forms M by 1 or 1 by N may be referred to as vectors which have their own specific properties and operations defined and are used extensively in 2D and 3D graphic simulations.

A degenerate subset of matrices of the form 1 by 1 may be referred to as scalars and constitute numbers quite familiar to the skilled person.

When the values of a matrix are constants, and the matrices are of compatible dimensions, certain operations such as multiplication are well defined. A 3 by 4 matrix A can be multiplied by a 4 by 5 matrix B to form a 3 by 5 matrix C which may often be written as:

$$A \times B = C$$

$$c_{i,j} = \sum_{k=1}^{4} a_{i,k} b_{k,j}$$

However, the operation B×A is not well defined because the inner dimensions do not match (5≠3), and k would not have a single range that is compatible with the indices of B and A.

A matrix whose elements are vectors or other matrices is known as a tensor (from which the name of Tensor Flow is derived). A familiar form of a tensor may be an RGB image. One form of an RGB image is an HDMI frame as a 1080 by 1920 matrix of RGB values each pixel of which is a 3 by 1 vector of color components. A pixel is considered a true vector because no linear operation of the Red component affects Green or Blue and vice versa.

An HDMI frame is not generally considered a five-dimensional matrix because the treatment of positions of pixels in the image is not related to treatment of the colors. It is valid and quite meaningful to crop an image by discarding parts of the image that are not of interest but there is no corresponding operation to crop color components. Likewise, there may be many operations on the colors with easily comprehensible effects that would be meaningless if applied to the elements of the containing array. So the HDMI fame is clearly a 2,3 tensor and not a 5D array.

There are many image processing algorithms known that may be expressed as matrix operations. A matrix operation is a succinct way of expressing repetitive operations and the rules of matrix mathematics are instrumental in proving specific propositions.

Execution of matrix-based algorithms on general purpose computer processors is generally accomplished by looping mechanisms, and both computer languages and hardware CPUs may have features to make such loops efficient. However, there is nothing inherent in the mathematics of matrix definitions that requires that operations be executed by any specific method or plan in order to compute correct results.

A modern hybrid of image processing and cognition is a convolutional neural network (CNN). While training such networks has been quite challenging for years, actually executing trained networks is relatively trivial.

In CNNs a convolutional output element operates by passing a small matrix or kernel (may be termed a patch) over an input tensor to produce a single value of an output tensor. Typically, when a neural network is used to process images, the first layer of the network operates on RGB pixels of the image and produces an output array of related size containing an arbitrary vector that is structurally unrelated to the RGB vector input. The output vector is generally described as features or activations. Subsequent layers in the CNN take output from preceding layers as their input, so only the very first layer acts on the pixel values; all the rest act on other features to produce more features. Each output feature of the convolution is unrelated and distinct from each other feature just as the color components are distinct from one another.

A common form of a CNN layer is a 3 by 3 Convolution. In operation a 3 by 3 kernel of constant weights is applied to a specific position of the input tensor (i. e. image) element wise; that is, each of the weights is multiplied by the pixel values at the same relative position in the image and the products are summed. Also, a bias constant may be added so that the initial value is not required to be zero.

If there are three input channels, as there are in an RGB image, then there are three distinct sets of 3 by 3 weights to be applied to each component (in the case of the first layer, the colors) but only a single bias, if a bias is applied. Each convolution of the now 3 by 3 by 3 weights plus bias forms a single output channel at a center of a 3×3 patch of pixels. Each output channel applies its own 27 weight values in turn, until all outputs for a given patch have been computed. It is common for a convolution to have between 64 and 256 output channels, each of which has a unique specific set of 27 weights plus a bias.

In this example each channel is multiplying its 27 weights against the same patch of 9 pixels of 3 RGB components. For a relatively small set of 64 channels, each individual component is multiplied by 64 arbitrary and unrelated weights. After the output for each patch is computed, an adjacent patch is loaded from the image and the full set of weights is applied again. This process continues until the right edge of the image is reached, and then the patch drops down one row and starts over from the left edge.

After the first layer is processed, the next convolution layer processes the output of the first as input to the second layer. So, a 3 by 3 convolution now has 3 by 3 by 64 weights to be applied to the 3 by 3 by 64 elements of the patch. If this layer has 256 outputs, 3×3×64×256=147,456 multiplications must be performed for each output position. The skilled person will understand that this refers to a single layer in a Deep Neural Network that may contain more than 40 layers.

The number of multiplications applied to each element of a patch is equal to the number of channels in the layer. In a standard CPU, these must necessarily be done in some sequence. Many modern CPUs have a capability of executing sets of multiplies simultaneously, especially if the data format is small (i.e. 8 bits). In a GPU or TPU, the number of multipliers available is much higher but each multiplier is designed to produce a product from two distinct and unrestricted factors.

In the current art processors, CPUs, TPUs or GPUs, do not take advantage of the simple fact that in CNN implementations one of the factors for multiplication is common for all the weights applied to an input channel during the processing for a patch.

The inventor in this application proposes a mass multiplier that performs all multiplications, otherwise conventionally done sequentially, in a single step. When the weights of a set of multiplications are all of some small precision (8 bits is typical for a TPU), there are a limited ($2^8$=256) number of distinct weights, and a corresponding number of distinct multiples of the common input (which may be of any size; no matter what precision the common factor is, there are still only 256 possible multiples when 8 bit weights are applied.) In this case there is a distinct advantage to implementing a circuit that produces all the required outputs at once with many fewer elements than the same number of unrestricted multipliers.

In an embodiment of the invention an equivalent mass multiplier is dedicated to a single input channel and is not always shared. So, the operation has an option of using several clock cycles and multiple register stages. This allows the operation to take very simple and efficient forms without impacting overall throughput of the system.

In common cases where a single dynamic value is multiplied by many constants, substituting a single multi-stage mass multiplier circuit, as in an embodiment of the present invention, for the equivalent set of independent single stage multiplier circuits results in a system that performs the same calculations with substantially higher throughput and substantially lower power and footprint. Even if the set of outputs is less than the number of actual multiples used, there may still be considerable savings in power and space.

Having established a distinct advantage of a unique mass multiplier in an embodiment of this invention over independent multipliers, reordering the sequence of operations can increase the advantage further.

There is nothing in the mathematics of a neural network (or other similar image processing) algorithm that requires any specific sequence of operations. If the same operations are done in any order, the same correct computation will be made. The inventor observes that the usual order for software executing on a CPU, GPU, or TPU-based design is to produce all output channels for a given position at the same time by multiplying the weights by the inputs and summing them immediately. Producing all output channels for a given position at the same time by multiplying the weights by the inputs and summing them immediately minimizes the number of times the inputs must be read from RAM as well as limiting the number of times the weights must be read, also from RAM. It does not eliminate reading the inputs multiple times because there is no place to retain them when processing the next row down other than RAM.

However, if, in an embodiment of this invention, the order of operations of a kernel is everted, that is, effectively turned inside out, then each input value is utilized only once, and no RAM buffers are required. Instead of producing outputs one at a time by reading the inputs redundantly as the kernel passes over each row, this unique operation processes the inputs one at a time and retains partial sums for all incomplete outputs. The partial sums may be retained in hardware shift registers or standard hardware first-in first-out registers (FIFOs), and the number of registers required to hold the values retained is proportional to the height of the kernel and the width of the input rows.

In this example of this invention, as channels of each new input position are presented, the channels represent the first element of the patch down and to the right, and simultaneously the last element of the patch up and to the left. This allows a computational circuit to be developed as an embodiment of this invention that has a fixed number of elements in process at all times (with some possible exceptions near the edges of the input) and produces outputs at the same rate as it accepts inputs.

Where the guiding algorithm requires the evaluation of the kernel over a patch that extends past the edge of the input array, many special cases and issues arise, but they are not insurmountable. Special case logic must be added such that the overlapping patch's partial results are made compatible with the normal case without introducing delays.

In embodiments of the invention this everted form of kernel operations accepts inputs as a stream and produces outputs as a stream. Inputs are not buffered in RAM because they are each referenced only once. Since the outputs are also in a stream, they also can be processed by subsequent layers without RAM buffering, which is a result attributable to this invention that substantially increases processing speed over many otherwise necessary read and write operations to RAM.

In an embodiment of the invention, in place of many layers sharing a single set of independent multipliers executing, storing and then reading back the results to process the next layer in sequence, a pipeline may be produced using dedicated mass multipliers that processes all layers simultaneously, feeding the streaming output of each layer into the input of the next layer without waiting for any layers to be complete.

A fully implemented pipeline in an embodiment of the invention thus may reach an effective throughput measured at two orders of magnitude greater than a conventional output-centric ordering process, and eliminates contention for RAM (because it doesn't use RAM). It is this contention for RAM that forms a primary bottleneck for GPU and TPU-based processing.

Latency of such a system in an embodiment of this invention is reduced to the time from input of last pixel to output of last result. Since the last pixel of the image, by definition of the algorithms, must necessarily be the last datum required to complete all of the final patch calculations, the latency of the system is strictly the clocking rate times the number of stages in the pipeline including the final output FIFOs.

Using a single dedicated mass multiplier for each input channel throughout a neural network in an embodiment of this invention (in place of a limited set of independent multipliers that must be reused and dynamically assigned) makes it possible to build a pixel-synchronous pipeline where all multiplications are executed in parallel because it only takes a single mass multiplier to process an arbitrary number of weights applied.

Having described the essential features of the innovation of mass multipliers, and also advantages of eversion, the inventor posits specific examples below:

FIG. 1 is a diagram illustrating an embodiment of the invention wherein each of a plurality of one or more source channels 1 through N, labeled 101a through 101d has a dedicated mass multiplier 102a through 102d assigned. Since each source channel in this example has a dedicated mass multiplier circuit to create the set of multiples of that channel's values, the source channel formats may vary between signed, unsigned, fixed or floating point in any precision convenient for the processing algorithm implemented in hardware. Specific outputs of each mass multiplier circuit, such as mass multiplier circuit 102c, may be fed directly into one or more computation units 103a through 103d that may perform calculations that require multiples of any or all of the source channels. Such computation units may be used to implement independent output channels of a single algorithm or unrelated algorithms to be computed on the same source channels. The outputs of the computations may be forwarded for further processing as shown at 104 as may be required by the algorithm, or algorithms implemented in hardware. This situation arises, for example, when implementing a Neural Network in a Field Programmable Gate Array (FPGA) where the weight values applied as multiplicands will not change.

Figure 2:
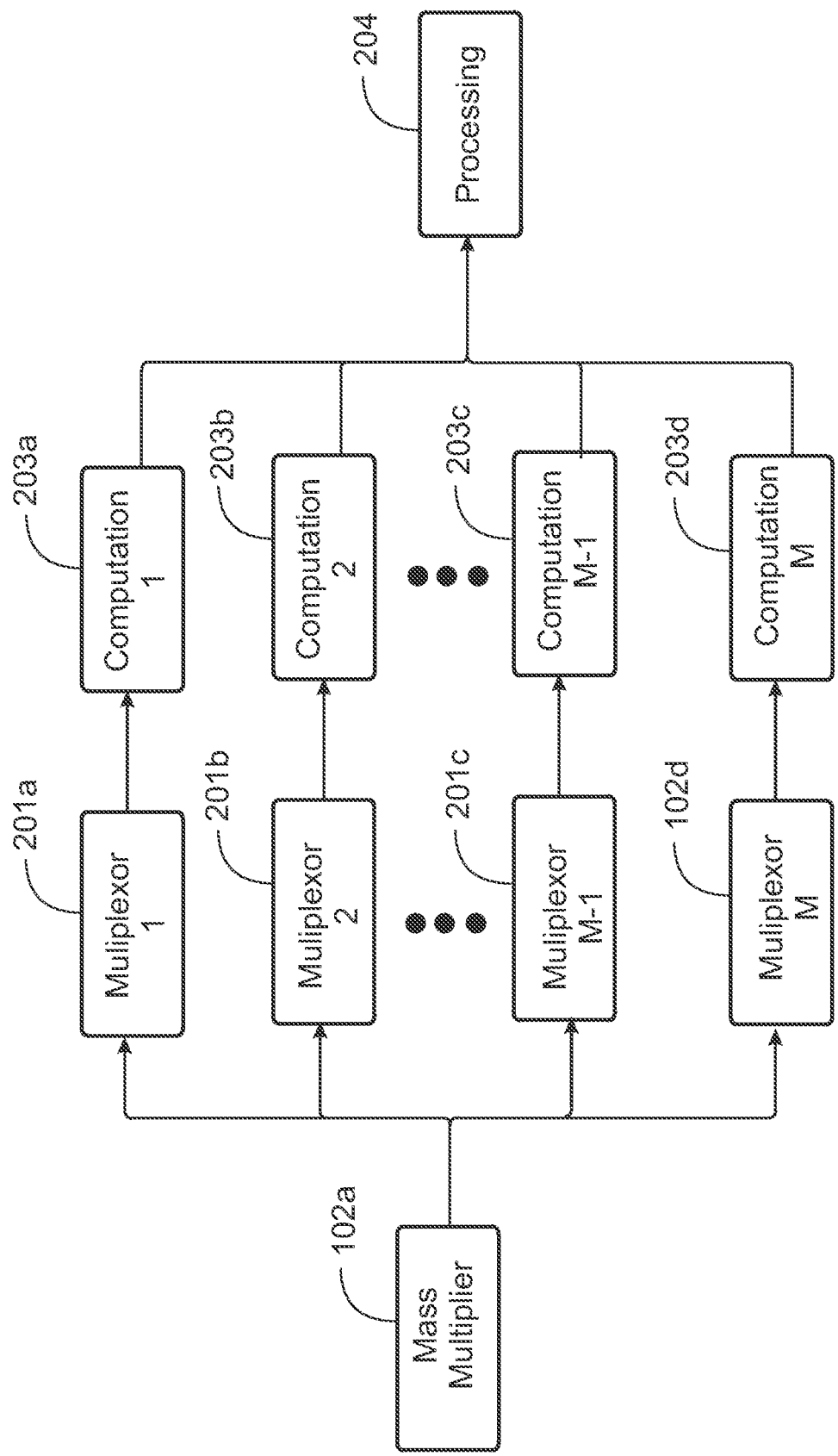
FIG. 2 illustrates an embodiment where the mass multipliers applied to each common source are dynamic and routed through multiplexors to the processing circuit.

FIG. 2 illustrates an embodiment of the invention wherein the outputs of each mass multiplier, such as mass multiplier 102a of FIG. 1, are fed through a set of multiplexors 201a through 201d into computation units 203a through 203d such that the multiple selected may be chosen either on initialization of the system, or dynamically as it operates. The outputs of the computations may then be forwarded for further processing at 204 as before. This situation arises when implementing a Neural Network in an application specific integrated circuit (ASIC) where the structure of the computation is committed but the weight values used need to be alterable.

Figure 3:
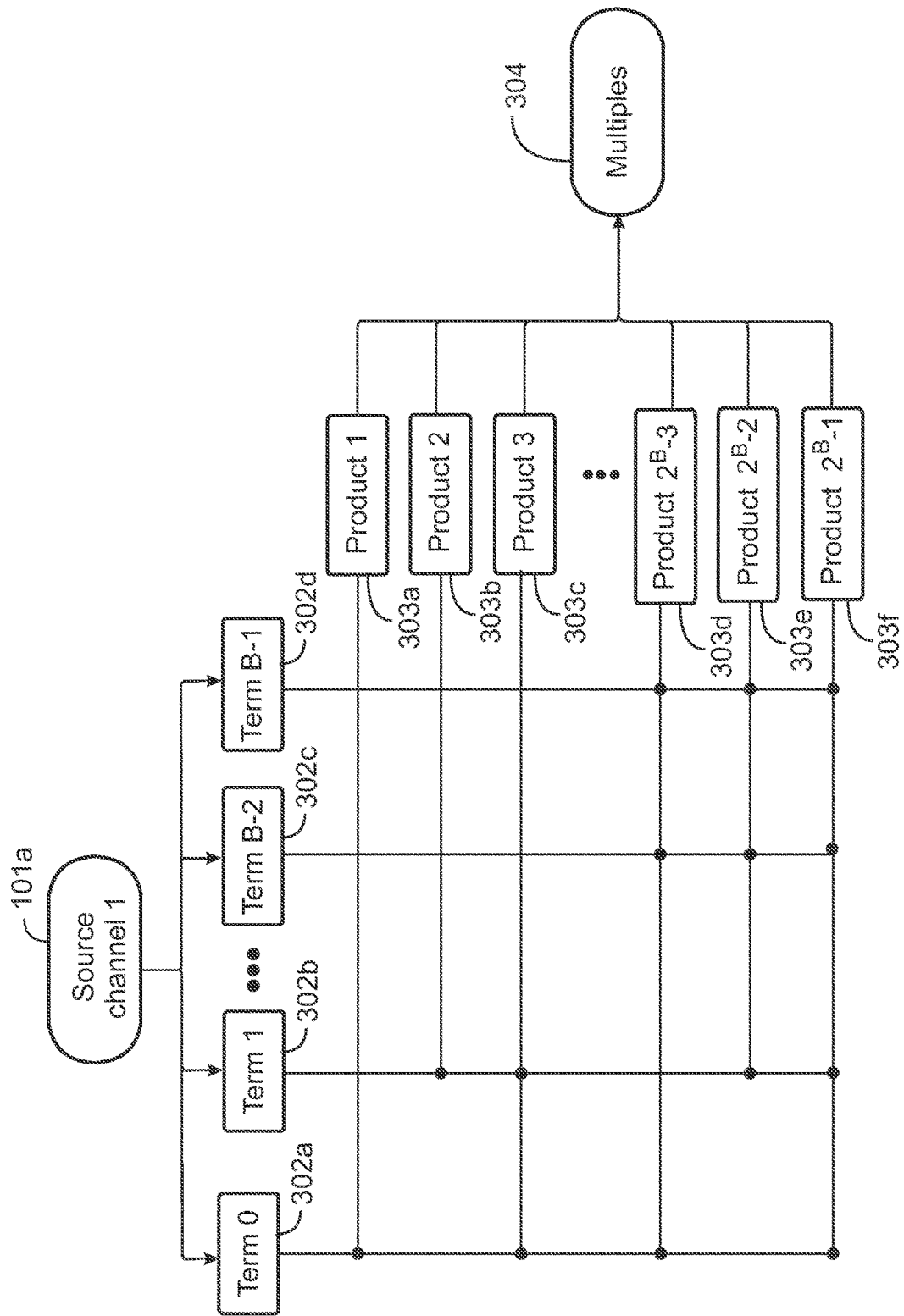
FIG. 3 illustrates a simple embodiment where shifted terms corresponding to bits set in each mass multiplier are summed to form a product.

FIG. 3 illustrates internal structure of mass multiplier 102a of FIG. 1 and FIG. 2 in one embodiment. This structure may be common to mass multipliers 102b, 102c, and 102d, as well as to other mass multipliers in other embodiments of the invention. In this structure products 303a through 303f of source channel multiplicand 101a of A bits by all possible multipliers of B bits are produced in parallel and delivered to multiples 304. In this example the A bits of source multiplicand 101a are duplicated and shifted up by appending 0 bits to the least significant position and padded by prepending 0 bits to the most significant position such that a full set of all required shifted values from 0 to B−1 are available in form of a vector of A+B bit terms 302a through 302d. These terms may be formed simply by routing circuit connections and no register or logic circuitry is required. In a case where the clock period is sufficient to allow a maximum of B terms of A+B bits to be composed in a single period, no registers or sub-composition may be required. Individual products 303a through 303f of the summed terms may be registered locally or forwarded for further processing as combinatorial logic. Each product of 1 to $2^B-1$ times a source multiplicand 101a may be formed by adding any or all of the B corresponding terms 302a through 302d wherever a 1 bit in each multiplier occurs. The multiple 0 of any and all sources is a constant of all 0 bits and may be included in multiples 304 for completeness when using multiplexors but otherwise requires no circuitry. Any unused products 303a through 303f may be omitted either by leaving them out of the circuit specifications, allowing the synthesis tools to delete them, or by any other method. Unused terms 302a through 302d may also be omitted but as they do not occupy logic this is generally without effect. In this fashion, all required multiples 304 of a source multiplicand 101 may be formed as a single stage pipeline or as combinatorial logic.

Figure 4:
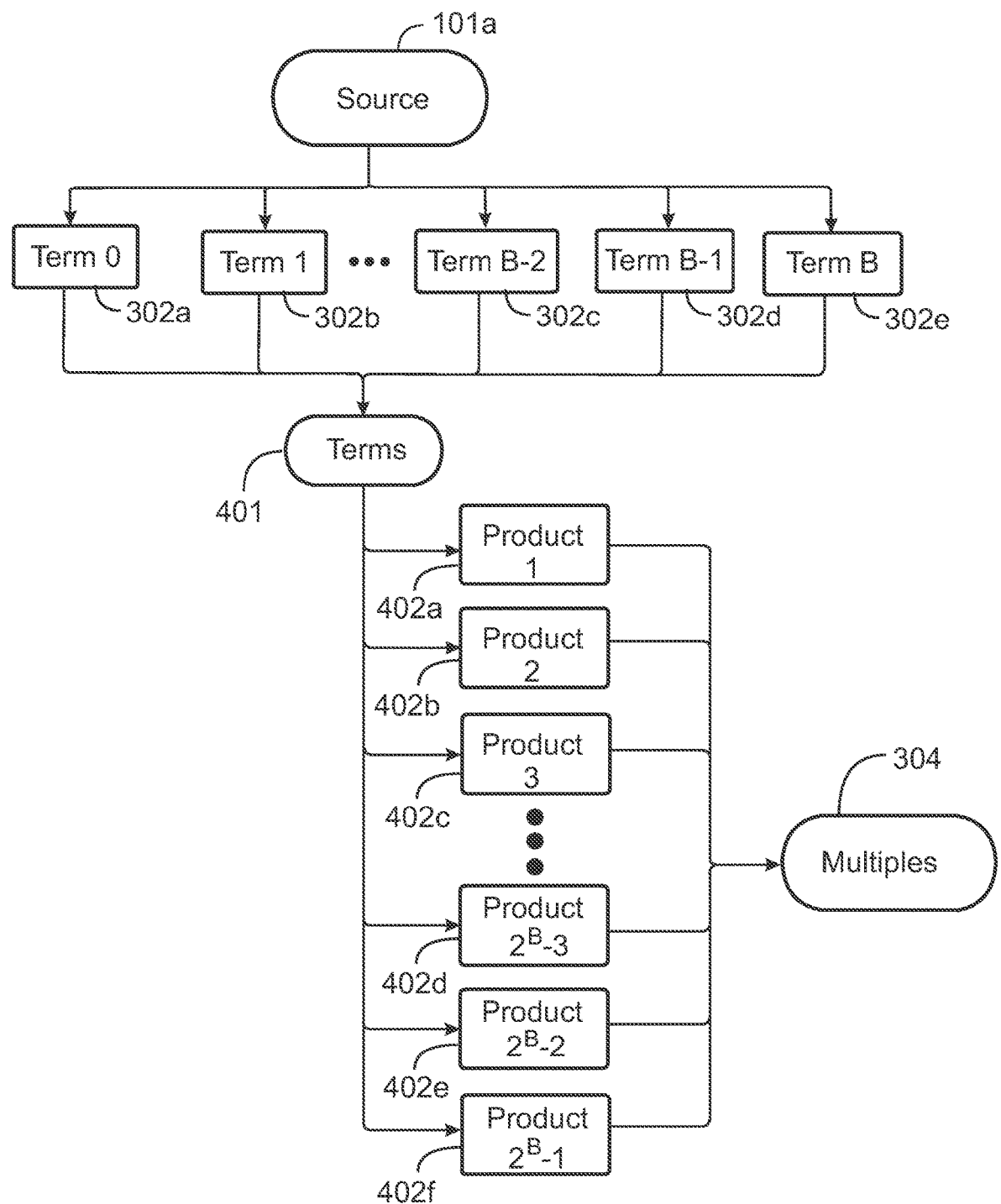
FIG. 4 illustrates an enhanced embodiment where addition and subtraction of shifted terms from each other are mixed to form an equivalent solution of lower complexity.

FIG. 4 shows an optimized embodiment wherein a set of terms 401 is comprised of all required individual terms 302a through 302e from 0 to B inclusive formed of A+B+1 bits. This allows for products 402a through 402f to include subtraction from a larger term in lieu of addition of smaller terms and may be used to reduce the overall size of a circuit which may also increase maximum allowed clock frequency. For example, for any given input a and multiplier 15, 8a+4a+2a+1a=15a combines four components while 16a−1a=15a combines only two and may be generally expected to be more compact and efficient. Each product 402a through 402f may be composed of any additions and subtractions of terms 302a through 302e that yield the correct result, and each specific variant may be chosen based on optimal tradeoffs for the specific implementation technology. For example, a subtraction of two N bit quantities may require more logic than an addition of two N bit quantities, but in general an addition of three N bit quantities will always require more logic than a subtraction of two. The treatment of required multiples 304 is unaltered by details of composing individual products 402a through 402f.

Figure 5A:
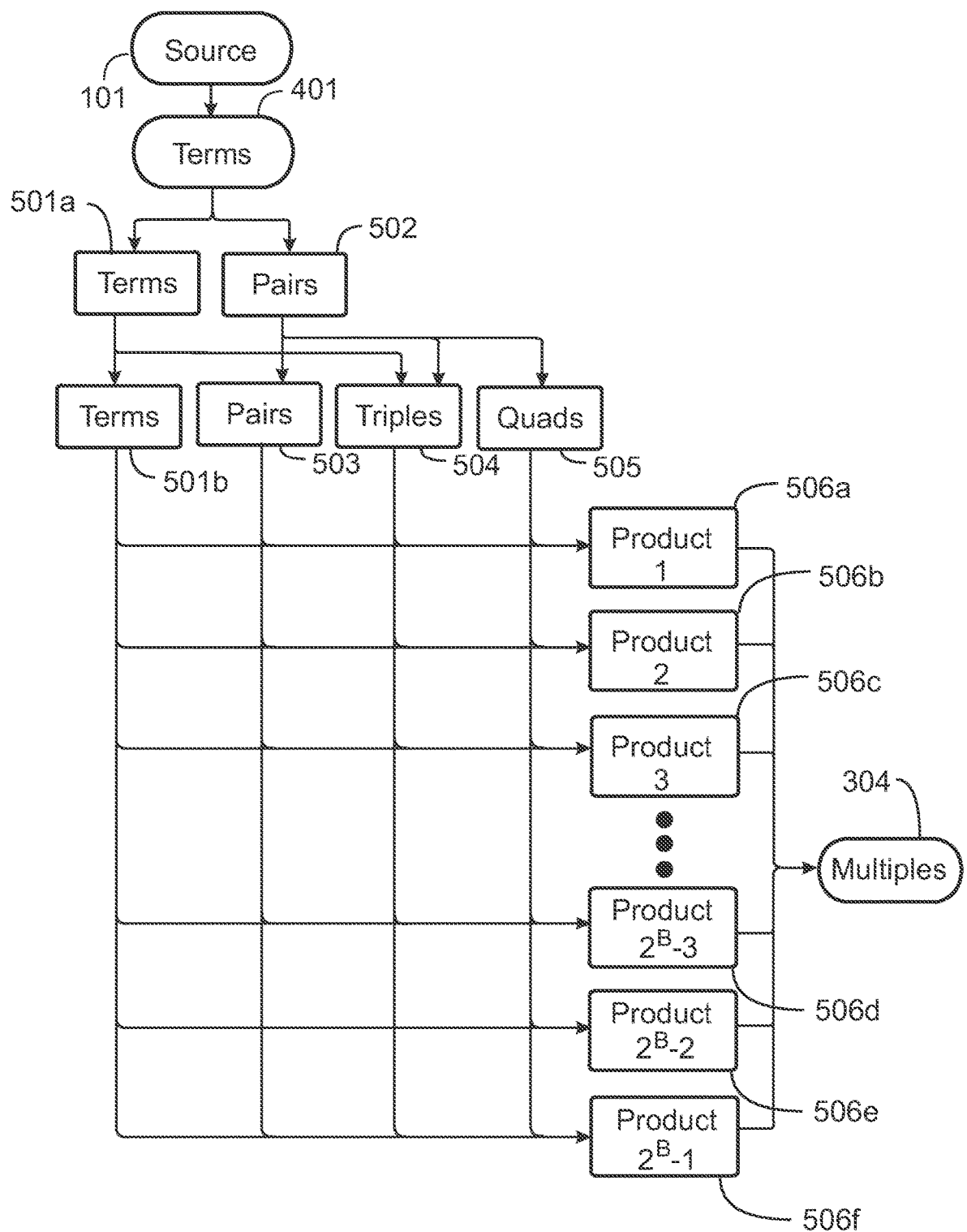
FIG. 5A illustrates a pipelined embodiment that maximizes clock frequency by building sub-compositions from only pairwise operations.

FIG. 5A illustrates an embodiment of a mass multiplier wherein the clock period is such that only a single addition of A+B bit values (or A+B+1 if subtractions are used) is possible per period. In this case, in order to accommodate multiples where more than two terms are utilized, it is necessary to arrange required elements into a multi-stage pipeline. Terms 401 are formed from each source channel 101 as before but are retained one or more times in pipeline registers 501a and 501b for later reference. Pairs 502 of two terms summed are computed and registered and then preserved 503 as necessary. Triples 504 are formed as sums of pairs 502 and retained terms 501. Quads 505 of term values are formed as sums of pairs 502. Any and all unused elements may be omitted and to increase overlap only descending sequences of addends may be specified. This ensures that redundant sums, e. g. a+b and b+a, are not both utilized and retained in the final circuit. Products 506a through 506f may utilize any addition or subtraction operation of any pair of registered sub-compositions that meet timing constraints. By consistently using the largest element available total size and hence power may be reduced but any combination of operations that yield correct results are acceptable.

The embodiment of FIG. 5A is sufficient to produce all required multiples where B=8. For larger multiple sets, sub-compositions shown may be recombined in further pipeline stages such that all required multiples 506a through 506f for any value of B may be composed from single clock operations on the extended set of sub-compositions that includes the previously disclosed retained terms 501b, retained pairs 503, triples 504, and quads 505 together with such other sub-compositions as required to form a set of terms sufficient to form the multiples 506*a* through 506*f* by single clock operations.

Figure 5B:
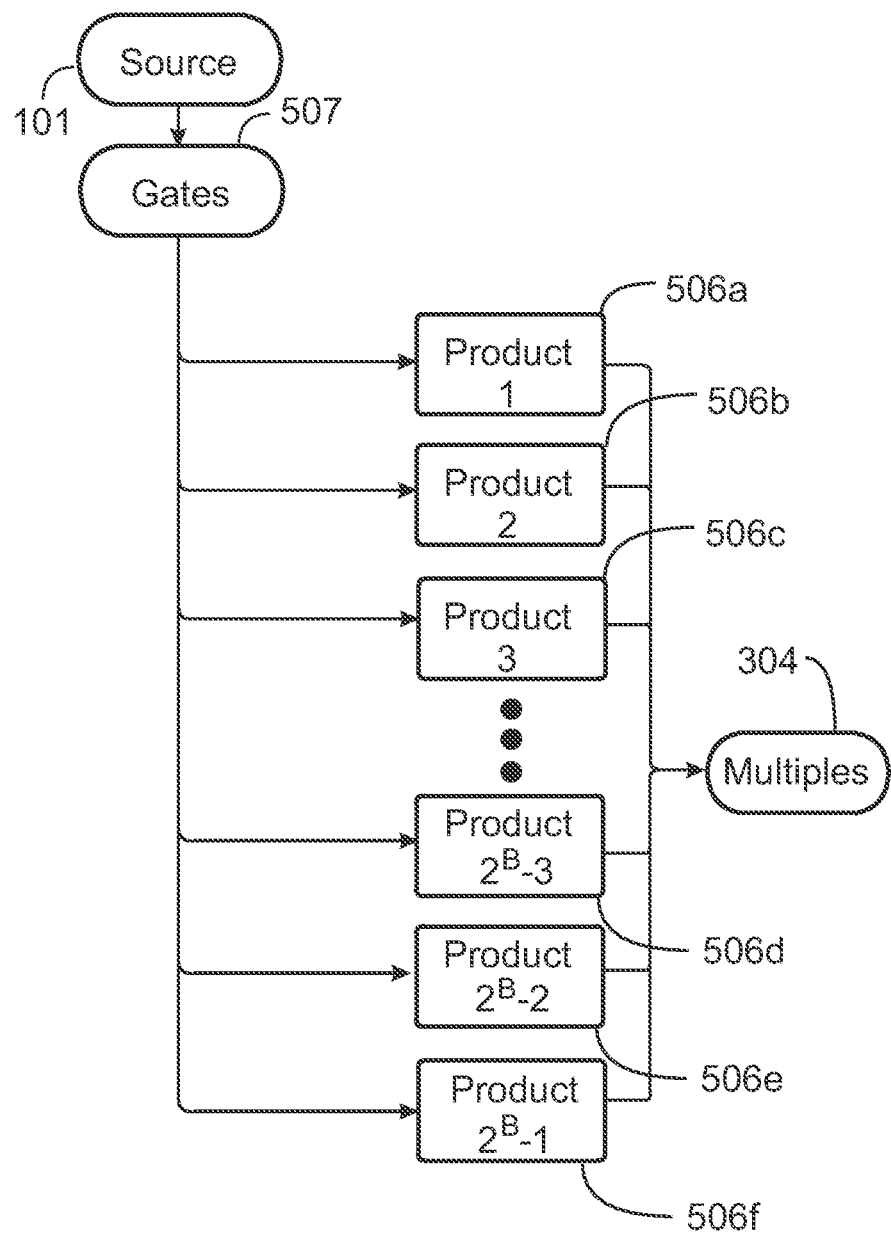
FIG. 5B illustrates an embodiment wherein the multiples are formed directly by a fixed set of cases without reference to standard arithmetic operations.

FIG. 5B illustrates an embodiment wherein the multiples are formed directly by a fixed set of cases without reference to standard arithmetic operations. For each of the required multiples the set of output values a*b is enumerated for each source channel value a. This allows for hardware circuit synthesis tools to determine an optimal logic circuit 507 to produce the full set of required multiples. Specification of the required output values for any given input value is typically made by enumeration in Verilog 'case' or 'casex' statements. This is distinct from a lookup table where the output values are stored and accessed via an index formed from the inputs because logic gates are used to implement the minimum subset of operations required to produce the full set of output values and redundant logic used to produce related subexpressions will be combined.

Which of methods 5A and 5B is most efficient in terms of space, frequency and power depends on specific values of A and B as well as the core efficiency of arithmetic operations vs arbitrary logic. Choice of which method to use may be based on direct observation, simulation or other criteria.

Figure 6:
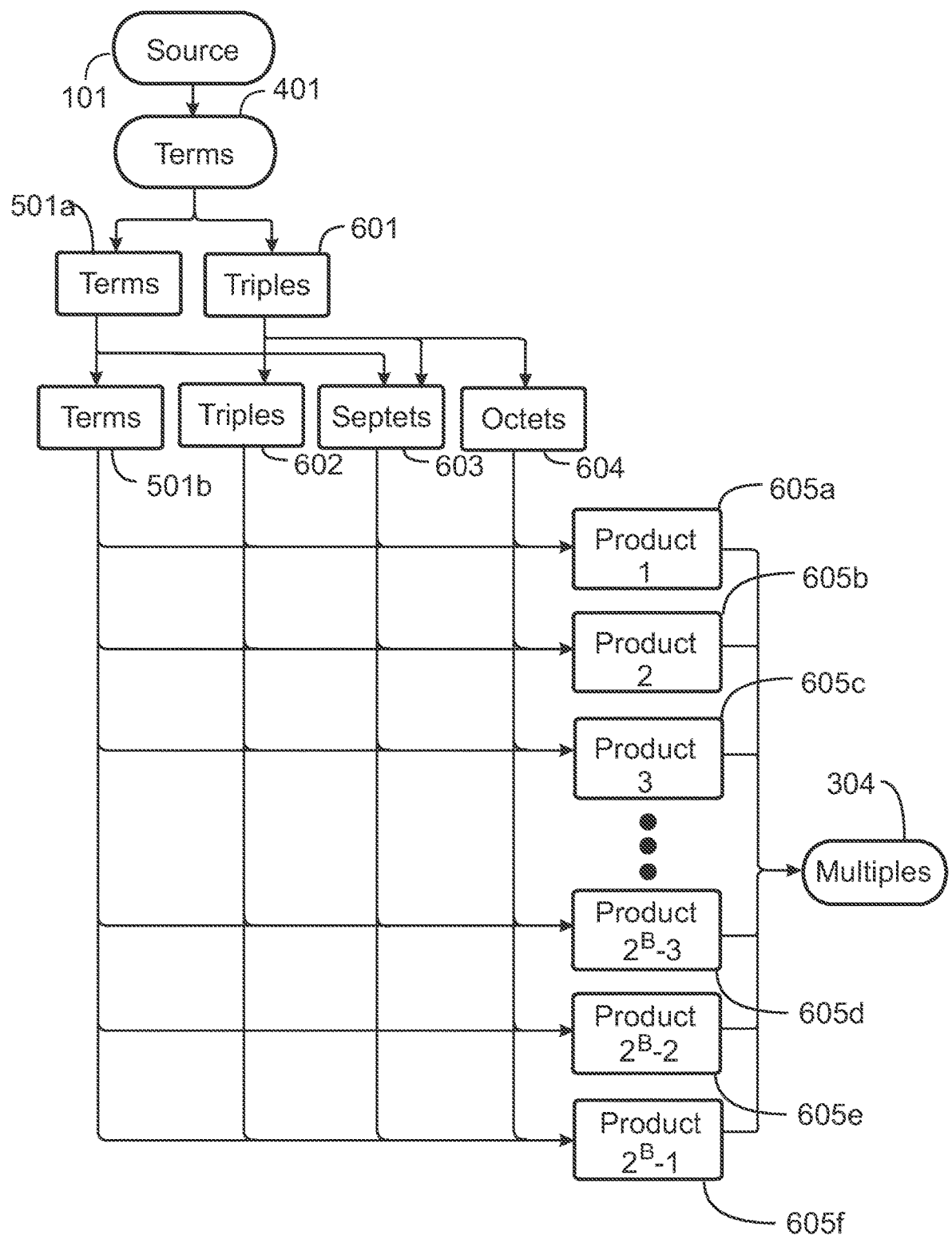
FIG. 6 illustrates a pipelined embodiment that maximizes circuit density by building sub-compositions from up to four-wise operations.

FIG. 6 illustrates an embodiment wherein the clock period is such that sufficient levels of logic allow for composition by addition and/or subtraction of four elements during each single clock period. By selecting from a set of sub-compositions, each product 605*a* though 605*f* may be produced by combining no more than four registered elements. As before, terms are retained in registers 501*a* and 501*b*, but triples 601 retained in 602 are composed directly from terms 401 and no pairs are used. Septets 603 and octets 604 are formed from triples 601 and retained terms 501*a*.

The example embodiment of FIG. 6 is sufficient to produce all required multiples where B=32. For larger multipliers, sub-compositions shown may be recombined four at a time in further pipeline stages to produce all required multiples for any value of B. The sub-compositions of elements shown are necessary and sufficient to produce all products where B=32 but other sub-compositions (perhaps chosen for consistency across different values of B) are acceptable.

When the set of multipliers is fixed, as is common for FPGA applications, then even a large, sparse set of multipliers may be efficiently implemented since common elements are merged and unused elements may be omitted. When synthesis tools perform this function automatically, an expression of a circuit may include all possible elements without explicitly declaring which multiples are used.

If operations on A+B or A+B+1 bit values cannot be completed in a single clock cycle, a multistage pipeline adder may be inserted for any single stage composition logic if extra pipeline registers are inserted as necessary such that all paths have the same number of clock periods. Pipeline stage periods may be instances of a single edge to edge clock transition, or a multicycle clock if throughput constraints allow. Neither multiple clock stages per operation nor use of multicycle clocking requires structural alteration to any embodiment other than the issues mentioned immediately above.

An important object of the invention is to provide to the industry mass multipliers implemented in integrated circuits, to be used in a variety of applications. Toward this end the inventor provides in one embodiment a mass multiplier implemented as an integrated circuit, the integrated circuit having a port receiving a stream of discrete values, and circuitry multiplying each value as received at the port by a plurality of weight values simultaneously; and an output channel providing products of the mass multiplier as produced.

In one version the discrete values received may be unsigned binary values of fixed width, the weight values may be unsigned binary of fixed width of two or more bits, and each multiple may be composed as a summation of bit-shifted duplicates of the input. In another version the set of shifted duplicates may be increased to allow the use of subtraction operations to reduce or otherwise optimize the circuit. Unused outputs of the set may be omitted either explicitly or implicitly.

In one embodiment the set of output products may be produced by combinatorial logic. In another the set of output products may be produced by a single stage pipeline, using single or multiple clock cycles. In another the set of output multiples may be produced by a multi-stage pipeline by combining no more than two addends per stage. Unused elements of the intermediate sub-compositions may be eliminated from the circuit either explicitly or implicitly.

In one embodiment the set of output products may be produced by a multi-stage pipeline by combining three or more addends per stage and the sub-compositions may be adjusted accordingly. Unused elements of the intermediate sub-compositions may be eliminated from the circuit either explicitly or implicitly.

Another object of the invention is to provide mass multiplication in integrated circuits to implement substantially improved convolutional neural networks in the ongoing evolution of deep learning and artificial intelligence. The inventor in this effort provides a first convolutional neural network (CNN) node, implemented as an integrated circuit, which has a first input channel defined as a stream of discrete values of a first component of an element of an array.

In this description the inventor intends the nomenclature of an element of an array to mean an element that may have a single component, or multiple components. A good example is an image, which may have pixels as elements, and each pixel may have a single component, if the image is monochrome, or three color values in one example, if the image is in RGB color. Each color value in this example is a component of the element, which is a pixel.

Continuing with the description above, of a first convolutional neural network (CNN) node, implemented as an integrated circuit, with a first input channel defined as a stream of discrete values of a first component of an element of an array, there is further in this CNN a first mass multiplier circuit multiplying the discrete values of the first component, as received, by a plurality of weight values simultaneously. An output channel provides an output stream of discrete values.

In one embodiment of the CNN node the first output stream is formed from products of the first mass multiplier circuit in some circumstances by combining products with constants and in some circumstances by applying an activation function.

In another embodiment the CNN node further comprises a second input channel defined as a stream of discrete values of a second component of the element of the array, and a second mass multiplier circuit multiplying the discrete values of the second component, as received, by a plurality of weight values simultaneously. In another embodiment there may be a third input channel defined as a stream of discrete values of a third component of the element of the array, and a third mass multiplier circuit multiplying the discrete values of the third component, as received, by a plurality of weight values simultaneously.

Having described a CNN node having one, two or three input component streams and dedicated mass multipliers, the inventor further provides a convolutional neural network (CNN) that has a first convolutional neural network (CNN) node, implemented as an integrated circuit, comprising input channels defined as streams of discrete values of components of elements of an array, mass multiplier circuits dedicated to individual input channels, multiplying the discrete values of components, as received, by a plurality of weight values simultaneously, and an output channel providing an output stream of discrete values, and a second CNN node having input at least partially dependent on output of the first node. This CNN may have successive nodes and may operate as a deep neural network (DNN). There is no requirement that successive nodes after the first node be CNN nodes.

The skilled person will understand that the embodiments illustrated in the figures and described above are all exemplary, and do not detail every form that the invention might take. There may be a variety of other forms that may be realized within the scope of the invention. The scope of the invention is limited only by the claims.

The invention claimed is:

1. A mass multiplier operating as a part of an integrated circuit implementing a convoluted neural network (CNN), comprising:
   a port receiving a stream of discrete data values column by column and line by line from a matrix of data values;
   first hardware circuitry multiplying each data value as received by a plurality of weight values of a specific aperture function simultaneously, creating a set of products;
   second hardware circuitry performing a subfunction of the specific aperture function for each data value as received, using individual ones of the set of products, producing partial output values for the aperture function; and
   third hardware circuitry retaining the partial output values and providing the partial output values back to the first hardware circuitry as needed to produce complete output values;
   wherein input values are received in a continuous stream and output values are produced in a continuous stream.

2. The mass multiplier operating as a part of an integrated circuit implementing a convoluted neural network (CNN) of claim 1 wherein the discrete values received are unsigned binary of fixed width, the weight values are unsigned binary of fixed width of two or more bits, and each multiple is composed as a summation of bit-shifted duplicates of the input.

3. The mass multiplier operating as a part of an integrated circuit implementing a convoluted neural network (CNN) of claim 2, wherein the set of shifted duplicates is increased to allow the use of subtraction operations to reduce or otherwise optimize the circuit.

4. The mass multiplier operating as a part of an integrated circuit implementing a convoluted neural network (CNN) of claim 3 wherein unused outputs of the set of shifted duplicates may be omitted either explicitly or implicitly.

5. The mass multiplier operating as a part of an integrated circuit implementing a convoluted neural network (CNN) of claim 1 wherein the set of products is produced by combinatorial logic.

6. The mass multiplier operating as a part of an integrated circuit implementing a convoluted neural network (CNN) of claim 1 wherein the set of products is produced by a single stage pipeline, using single or multiple clock cycles.

7. The mass multiplier operating as a part of an integrated circuit implementing a convoluted neural network (CNN) of claim 1 wherein the set of products is produced by a multi-stage pipeline by combining no more than two addends per stage.

8. The mass multiplier operating as a part of an integrated circuit implementing a convoluted neural network (CNN) of claim 7 wherein unused elements of intermediate sub-compositions are eliminated from the circuit either explicitly or implicitly.

9. The mass multiplier operating as a part of an integrated circuit implementing a convoluted neural network (CNN) of claim 1 wherein the set of products is produced by a multi-stage pipeline by combining three or more addends per stage and the sub-compositions are adjusted accordingly.

* * * * *